(12) United States Patent
Galand et al.

(10) Patent No.: US 6,188,698 B1
(45) Date of Patent: Feb. 13, 2001

(54) MULTIPLE-CRITERIA QUEUEING AND TRANSMISSION SCHEDULING SYSTEM FOR MULTIMEDIA NETWORKS

(75) Inventors: Claude Galand, la Colle sur Loup; Jean-Marie Munier, Cagnes sur Mer; Victor Spagnol, Cagnes sur Mer; Pierre-Andre Foriel, Cagnes sur Mer; Jean-Marc Berthaud, Villeneuve Loubet; Aline Fichou, la Colle sur Loup, all of (FR); Marcus Enger, Hirschhorn (DE)

(73) Assignee: Cisco Technology, Inc., San Jose, CA (US)

( * ) Notice: Under 35 U.S.C. 154(b), the term of this patent shall be extended for 0 days.

(21) Appl. No.: 09/013,701

(22) Filed: Jan. 26, 1998

(30) Foreign Application Priority Data

Dec. 31, 1997 (EP) .................................................. 97480090

(51) Int. Cl.[7] ........................ G01R 31/08; G06F 11/00; G08C 15/00; H04L 12/28; H04L 12/56
(52) U.S. Cl. ........................ 370/412; 370/229; 370/389; 370/400; 370/438
(58) Field of Search ..................... 370/412, 416, 370/229, 230, 409, 418, 391, 400, 438, 413, 415, 417

(56) References Cited

U.S. PATENT DOCUMENTS

| | | | | |
|---|---|---|---|---|
| 5,463,620 | * | 10/1995 | Sriram | 370/60 |
| 5,499,238 | * | 3/1996 | Shon | 370/60.1 |
| 5,850,399 | * | 12/1998 | Ganmukhi et al. | 370/412 |
| 5,859,835 | * | 1/1999 | Varma et al. | 370/229 |
| 5,953,341 | * | 9/1999 | Yamanaka et al. | 370/416 |
| 5,995,511 | * | 11/1999 | Zhou et al. | 370/412 |

* cited by examiner

Primary Examiner—Huy D. Vu
Assistant Examiner—M. Phan
(74) Attorney, Agent, or Firm—Cesari and McKenna, LLP

(57) ABSTRACT

A packet scheduling system for use in a switching node of a high speed packet switching network. Incoming packets are enqueued in connection queues. Each connection is classified as red (exceeding traffic profile) or green (within traffic profile). QOS priority is also identified for each connection. Packets are dequeued for transmission as a function of priority class and connection class. Higher priority class connections have priority over lower priority class connections. Within a given priority class of connections, green connections have priority over red connections. Round robin scheduling is used for packets from connections in the same priority and connection class. In addition, a dynamic priority coupling mechanism is provided to prevent red higher priority traffic from blocking green lower priority traffic.

15 Claims, 10 Drawing Sheets

MULTIPLE-CRITERIA QUEUEING AND TRANSMISSION SCHEDULING SYSTEM FOR MULTIMEDIA NETWORKS

TECHNICAL FIELD

The present invention generally relates to multimedia networks and more particularly to a packet/cell queueing and transmission scheduling system for transmitting packets from applications of different types over the same network components, according to multiple criteria in order to ensure a suitable quality of service for a wide range of applications.

BACKGROUND ART

The emergence of high speed networking technologies such as ATM cell-based technology, now makes possible the integration of multiple types of traffic like speech, video and data over the same communication network. The communication circuits which may be shared in such network include transmission lines, program controlled processors, nodes or links, and data or packets buffers. An access node in such network should thus be designed for supporting the access of the user existing communication equipments with their corresponding protocols such as X.25, APPN, FDDI . . . as well as for accommodating new equipment supporting ATM. Accordingly, it is essential to know the different requirements of each traffic in order to optimize the different processes. Real-time traffics have more constraining requirements than non-real-time ones i.e. end-to-end delays and jitters. It is necessary to be able to give priority to the real-time packets in order to minimize these delays. Meanwhile, the packet loss must be guaranted both for real-time and non-real-time applications which have reserved bandwidth in the network, while it is not mandatory for non-reserved type of traffic.

Therefore, it is important to provide the network components (i.e. nodes or links) with mechanisms that control the priority of the packets, and process them in order to guarantee the desired quality of service (QOS) to their corresponding connections. It is also important to offer the same service to connections having the same QOS requirements by providing them with a fair share of the network transmission capacities.

Another important objective in multimedia networks is to simplify the configuration and the management of the networks. One common case is to provide a certain flexibility in the definition of the connections by allowing a connection to send a certain amount of excess traffic over the network. This provides an error margin in the network configuration and allows a better resources utilization. In the other hand, well-behaved connections whose traffic profile remains within their contract (based on traffic descriptors) should not suffer from misbehaving connections that send excess traffic. Therefore, the behaviour of a connection that is, the adequacy between the connection's traffic contract and its actual traffic, appears to be also an important criterion to take into account when controlling the transmission of data over the network links.

Traditionally in high speed networks based on bandwidth reservation, there are dedicated functions generally called buffer management and scheduling functions implemented at node or trunk level, and which are responsible for transmitting the packets from one node to another while ensuring that each connection gets the quality of service it has been guaranteed. In a multimedia network that handles data of multiple traffic profiles, a proper buffer management and packet transmission scheme is mandatory for ensuring efficiently the connections' quality of service.

In the prior art, there are many implementations of buffer management and transmission scheduling schemes. Some rely on priority scheduling (e.g. real-time, non-real-time queueing), which resides in implementing priority queues at link level and scheduling the transmission of packets with regard to the priority of the queue from which they originate. With this type of transmission scheme, a connection that sends low priority traffic would be penalized if it shares the (virtual) channel with connections that send high priority traffic.

Other transmission scheduling techniques rely on a so-called fairness among connections. Generally, one queue per connection is implemented and a scheduler transmits packets from the queues in a fair way, using for example a known round-robin scheduler. With this type of scheme, the traffic profile of a connection (e.g. real-time, non-real-time) is usually not considered, which may raise problems of QOS guarantee when connections send traffic of different types.

Typically, transmission scheduling schemes do not use the behaviour of a connection as transmission criterion. This aspect is generally treated by the network congestion control function and more particularly by the traffic policing process which is typically performed at the network access points. One well-known congestion preventive rate-based access control technique is based on the so-called buffered leaky bucket scheme. Some of these leaky bucket congestion control schemes involve the marking of packets entering the network: packets are marked with one of two "colors", red and green. Green packets represent traffic that is within the connection's reserved bandwidth, and are guaranteed a prespecified grade of service based on some level of delay and loss probability within the network. Red packets, on the other hand, represent traffic sent over and above the reserved rate and can be viewed as an emergency relief mechanism coming to play during an overload period where the instantaneously offered traffic is above the reserved bandwidth. In other words, the amount of traffic in excess of the allocated bandwidth is marked red and sent into the network, instead of being dropped at the source. Red packets allow a source to exploit any unused network bandwidth in order to improve the efficiency of the statistical multiplexing.

Therefore, In multimedia networks, a queueing and transmission scheduling system that provides fairness among connections as well as relying on connections priority and behaviour would ensure more efficiently that each connection gets the quality of service (QOS) it has been guaranteed whatever its traffic profile is. Accordingly, the invention described herein relates to a queueing and scheduling mechanism for transmitting packets sent on a transmission medium in a multimedia network node, and is particularly concerned with effectively providing a suitable quality-of-service for a wide range of traffic applications.

SUMMARY OF THE INVENTION

It is therefore an object of the present invention to provide a switching node in a multimedia network that includes a flexible and efficient packet queueing and transmission scheduling system and method.

It is a further object of the invention to provide a queueing and transmission scheduling system and method for use in a multimedia network, that ensures a suitable quality of service for a wide range of applications.

It is still another object of the invention to provide a queueing and transmission scheduling system and method in a multimedia network, that relies on multiple criteria such as connection priority, connection behaviour and fairness.

In brief, according to the invention, these and other objects are accomplished by providing a system and method of packet queueing and transmission scheduling for use in a switching node of a high speed packet switching network, the switching node having a plurality of input and output links for receiving and transmitting packets originated from a plurality of connections from a wide range of applications. The system comprises:

means for classifying each of the plurality of connections as red or green depending on whether said each connection transmits excess traffic or not, so as to achieve a behaviour classification of said plurality of connections;

means for temporarily storing said packets originated from said plurality of connections into a plurality of queues referred to as connection queues, wherein there is one queue per connection and wherein all packets originated from one of said connections are stored into the same queue;

means for determining for each of said connections a priority class indicative of the quality of service requested by said each connection;

means for scheduling the transmission of the packets over at least one output link, said packet transmission scheduling being accomplished by dequeueing packets from said plurality of connection queues, in an order determined according to the respective priority class and behaviour (red/green) classification of each of said connections.

More particularly, the system further comprises:

means for transmitting packets from a higher priority class connection before packets from a lower priority class connection, thereby achieving a per priority class scheduling;

means for transmitting packets from one connection of a given priority class that is classified as green before packets from another connection of the same priority class that is classified as red, thereby achieving a per connection behaviour scheduling;

means for transmitting packets from connections having identical priority class and behaviour classification according to a round-robin service discipline, thereby assuring fairness.

According to a further aspect of the present invention, there is provided a means for dynamically coupling connections of a first higher priority class to connections of a second lower priority class such that transmission of red packets from said first higher priority class connections, does not block transmission of green packets from said second lower priority class connections. More particularly, this means for dynamically coupling group of connections from different priority classes further comprises:

means for computing the total amount of red packets of said first and second priority classes already queued in the connection queues associated with said first and second priority classes;

means for computing the total amount of green packets already queued in said second priority class connections queues; and means for comparing the total amount of red packets of said first priority class to a dynamic coupling threshold (RT2_THRC) and discarding any incoming red first priority packet if said total amount of red first priority packets is greater than said dynamic coupling threshold; wherein said dynamic coupling threshold is set to a first predefined value (V1) when the total amount of green packets of said second priority class already queued is greater than zero, or it is set to a second predefined value (V2) otherwise; with said second predefined value (V2) being greater than said first predefined value (V1).

The scheduling and transmission scheduling technique of the invention has the advantage over prior art of being very flexible and efficient, as it is based on multiple criteria, while prior art generally considers only one, and accordingly the invention can accomodate a wide range of application types, as in a multimedia network, by providing applications sharing the network with a suitable quality of service.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

Figure 1:
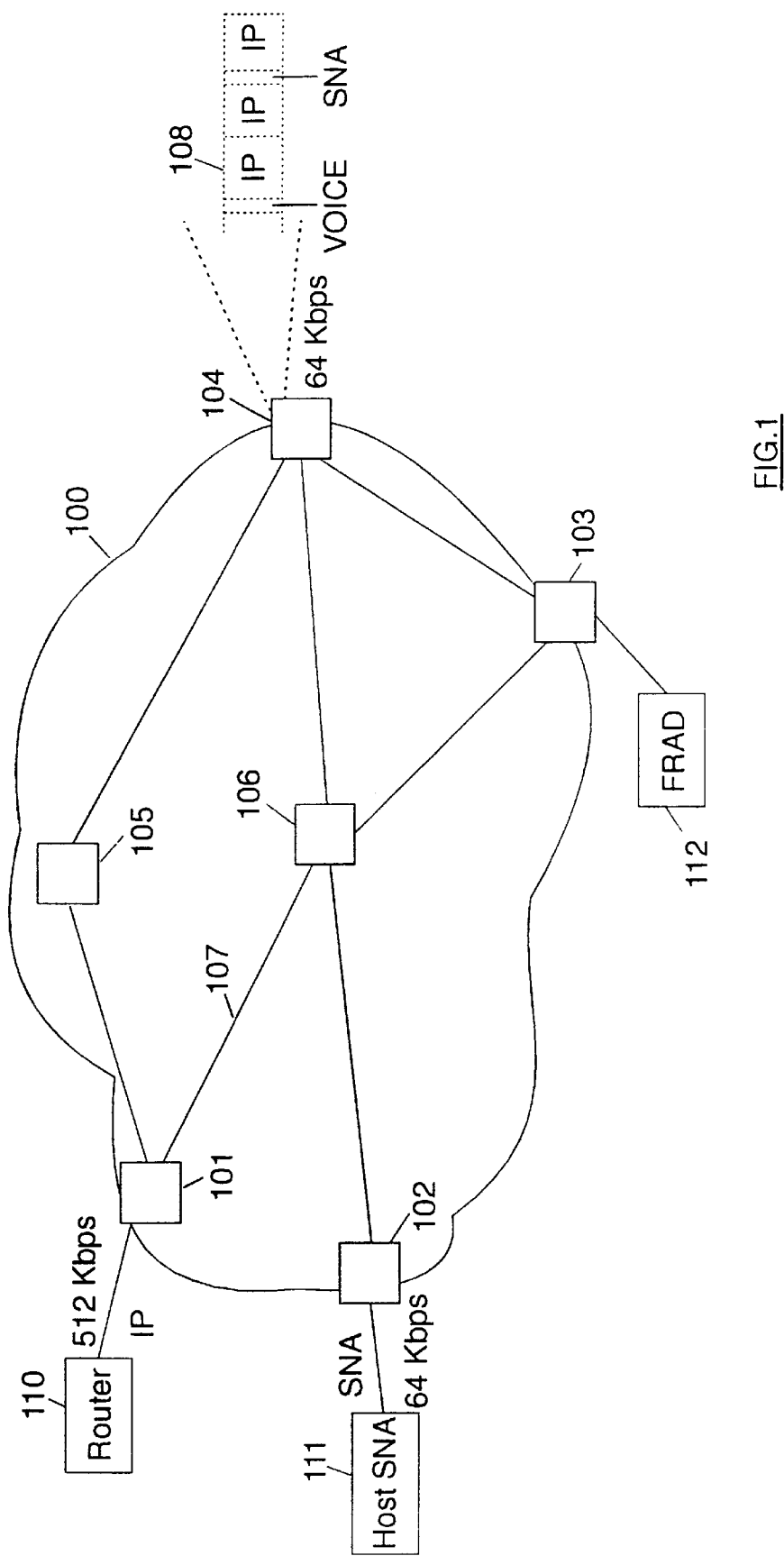
FIG. 1 shows a high speed packet/cell switching network supporting different types of applications.

Referring to FIG. 1 there is shown a typical high speed packet/cell switching network wherein connected user applications generate different types of traffic over the network. Network 100 comprises four access switching nodes 101 to 104, and two internal switching nodes 105, 106. Network nodes are interconnected by network links e.g. 107, also referred to as trunks. A router 110 transmits LAN (local area network) batch traffic in IP (Internet Protocol) format at a rate of 512 Kbps (thousands bits per second) over the network, via access node 101. A host computer 111 sends SNA (Systems Network Architecture) traffic at a rate of 64 Kbps to network access node 102. Attached to access node 103 is a Frame Relay Access Device (FRAD) 112 for transmitting voice or video data over the network. With such different applications sending traffic over the network, it is then usual in such network that a switching node transmits data from connections having different traffic profiles. In FIG. 1, access node 104 outputs data over the same external 64 Kbps transmission line, from connections originating from router 110 (IP data), from Host computer 111 (SNA data), and FRAD 112 (voice data). Thus, the difficulty for such network is to provide each connection with the pre-specified quality of service (QOS). Indeed, some connections are very delay-sensitive, such as voice or video; other are not sensitive to delays but require a very low packet/cell loss in order to behave correctly, with limited retries. In the network example of FIG. 1, the problem posed is as follows. Access node 104 transmits on a common output line, mixed data originating from the three pre-cited connections. As the "IP device" 110 sends data over the network at an access rate 512 Kbps which is high in comparison with the others, a great amount of packets (herein "packet" designates interchangably packet or cell) are sent to output access node 104 in a short period of time and are enqueued there, in the only queue 108 that is typically available for all the incoming traffic. As the output line has a lower rate (64 Kbps), a great number of IP packets are enqueued before they are transmitted. In the other hand, packets from other connections entering the network at a "regular" rate (64 Kbps) will also be enqueued in output access node 104, and as there is only one output queue 108 for all traffic, packets from these connections will be "embedded" in numerous "IP" packets. This induces significant delays between packets from these connections when transmitted in the output line. Due to these delays, the transmission quality is corrupted and for connections transmitting interactive data such as in SNA communication or real time traffic such as speech, this may cause active connections to fall. As illustrated with this example, it is then necessary to differentiate packets based on their connection traffic profile, and schedule their transmission in such a way connections QOS requirements are satisfied.

Figure 2:
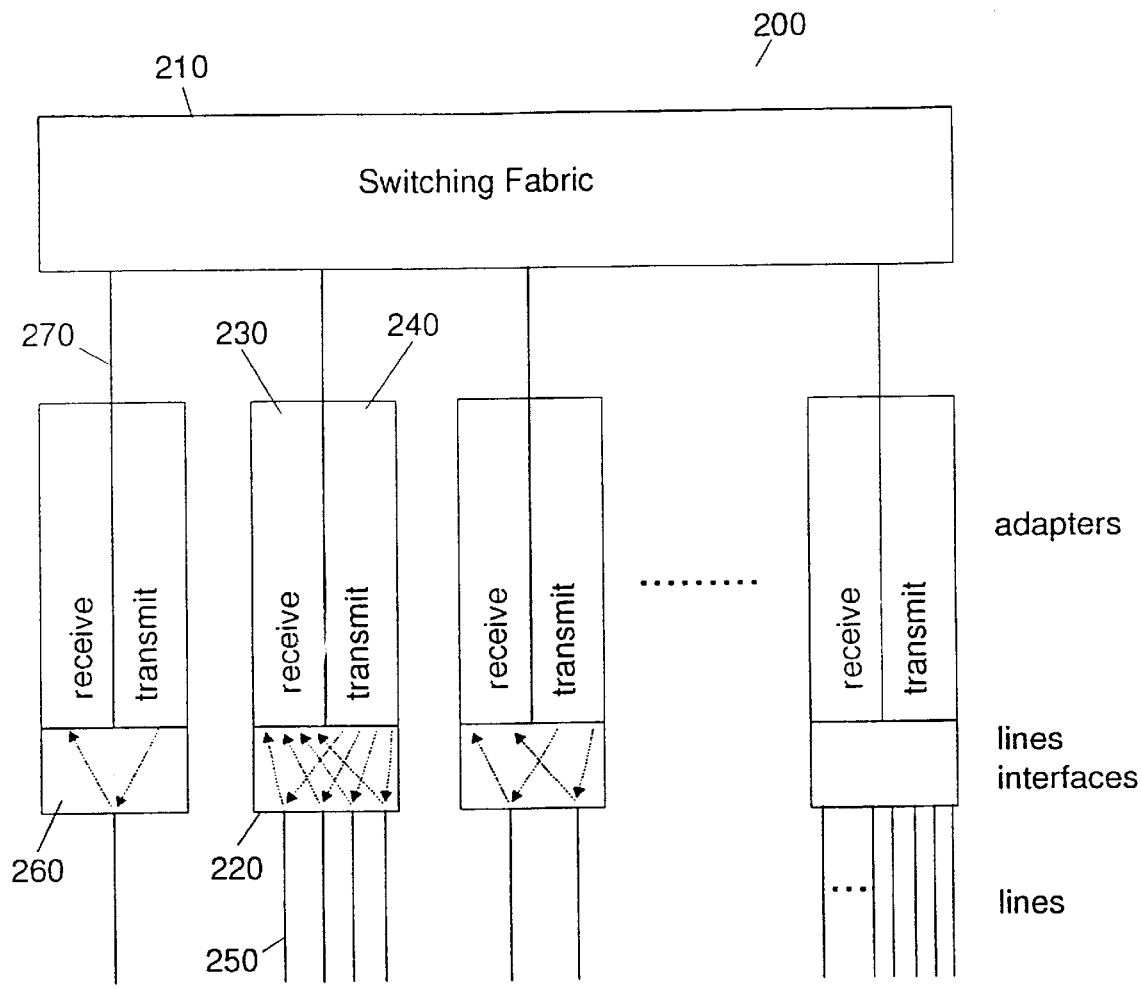
FIG. 2 is a high-level view of the internal structure of a switching node of the network of FIG. 1.

Referring now to FIG. 2, there is shown a switching node which can be either an access node or an internal node of the network. Communication to the node is accomplished by means of adapters components 220 which connect communication lines 250. Switching fabric 210 connects the various adapters at very high speed. Each adapter connects on one side to external lines via line interface couplers (LICs) 260 and on the other side to one port (270) of the cell/packet switch 210. Packets are received over the external lines 250, either a trunk i.e. an internal link or a port i.e. a network access link. Each of these packets is associated with one network connection which is either starting, transiting or terminating in this node. Accordingly, adapters can be of two different types, that is, access adapters or transit adapters. Access adapters establish data communication from outside to inside the network, i.e. from network attached data terminal equipments (DTEs) to network access nodes. Transit adapters, in the other hand, ensure data transmission between nodes inside the network. Each adapter, whether access or transit adapter, includes two parts: a receive part 230 and a transmit part 240. Receive part 230 receives data flow entering the node while transmit part 240 outputs data flow from the node towards another node (the next node of the path) or to a destination DTE, via comunications lines 250. Access adapters also support the task of call admission control, that is, the process of analysing the parameters of a new connection in order to decide whether the connection should be accepted or not, taking into consideration the availability of the network's resources. Another important task performed by access adapters in their receive part, is to control the entering flow from a connection and policing the traffic in function of its compliance to the connection agreed-to traffic descriptors. This policing function comprises marking packets, as excess (red packets) or non-excess (green packets), and discarding. In the other hand, transit adapters do not include such marking function, they may only apply a selective packet discarding, and manage entering traffic e.g. by performing routing functions. Each network node further includes a serie of queueing elements for queueing incoming and departing packets. Queueing is preferably implemented at adapter level rather than at switch level because the process speed of the switch itself (switch fabric 210) is generally much higher than the process speed of an adapter. Thus, these queueing elements are essentially located at adapter level, as described hereinafter in connection with FIG. 3.

Figure 3:
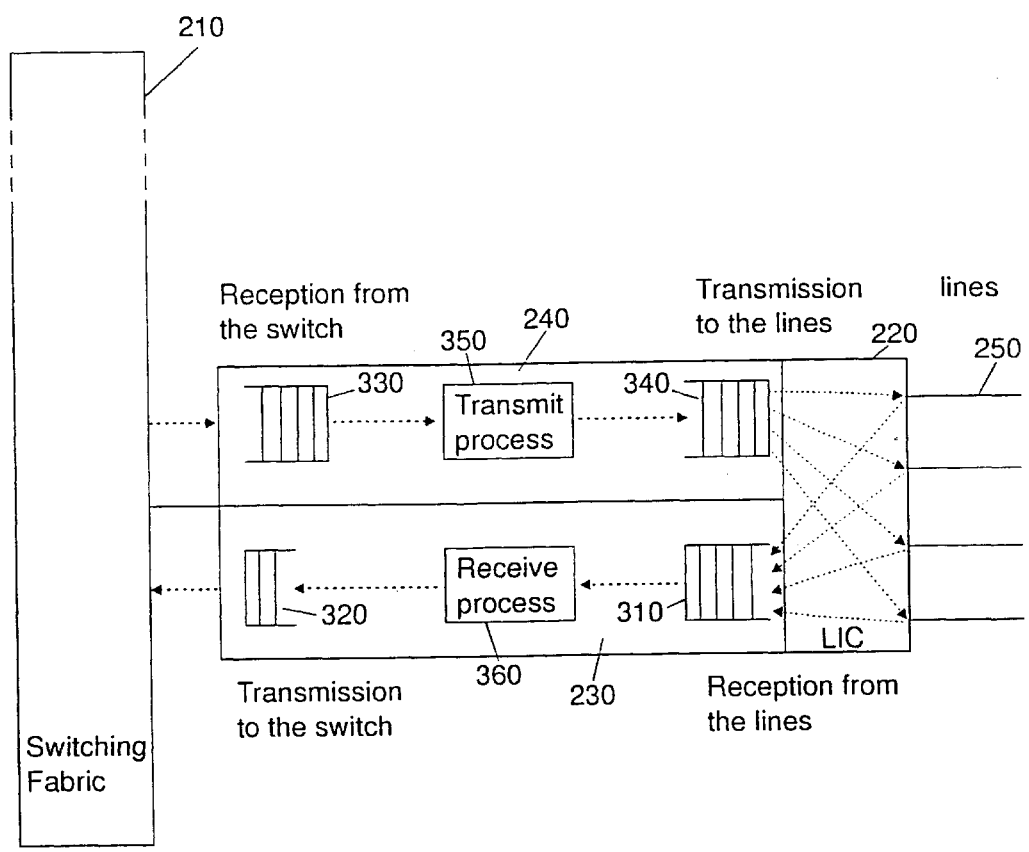
FIG. 3 shows the main queueing points of a switching node according to FIG. 2.

Referring to FIG. 3, there is shown the main queueing points of an adapter in a switching node. In adapter 220, four queueing points can be identified, two (330, 340) are located at the transmit part 240 of the adapter, and two others (310, 320) are located at the receive part 230 of the adapter. On adapter receive part 230, once a packet has been received from one of the output lines 250, a receive process 360 is performed. Such a receive process 360 includes connection policing, routing, statistics updates, CRC (Cyclic Redundancy Checksum) checking. Depending on the architecture of the adapter, the receive process is implemented by means of a specific hardware logic, or through a processor enabled software. The software solution provides more flexibility, but it is generally less efficient in terms of speed than the specific hardware solution, and consequently a queue 310 may be implemented for queueing incoming packets arriving faster than they can be processed by receive process element 360. Generally this queueing is limited to compensate for potential bursts of packets. A second queue 320 of adapter receive part 230 may be implemented to compensate for potential congestion of switch 210, but this queueing is negligeable as switches are generally designed to operate faster than adapters. Now regarding the adapter transmit side, a packet that passes from switch 210 to adapter transmit part 240, is firstly queued in switch output queue 330 before it is processed in transmit process element 350. Transmit process element 350 determines the destination output line (250) to transmit packets over. Queue 330 is thus intended to compensate for a lower processing rate of transmit process 350 compared to the arrival rate of incoming switched packets, depending on the implementation type (software/hardware) of the adapter. Generally, when the implementation is software, the adapter processor running the code is designed to sustain a predetermined transmit packet rate and queueing of packets in queue 330 is limited to compensate for potential bursts of packets. Before they are transmitted over destination output lines, packets are queued in adapter output queue 340. As network links are generally designed to sustain the traffic characteristics offered and no more (for cost-effective reasons), when congestion occurs the first resources to be saturated are generally the links. Consequently, adapter output queues constitute the major queuing element in the switching node to compensate for congestion at link level. In view of the foregoing reason, the implementation of the present invention focuses on adapter output queues 340 that is, the switching node output transmission queues.

Figure 4:
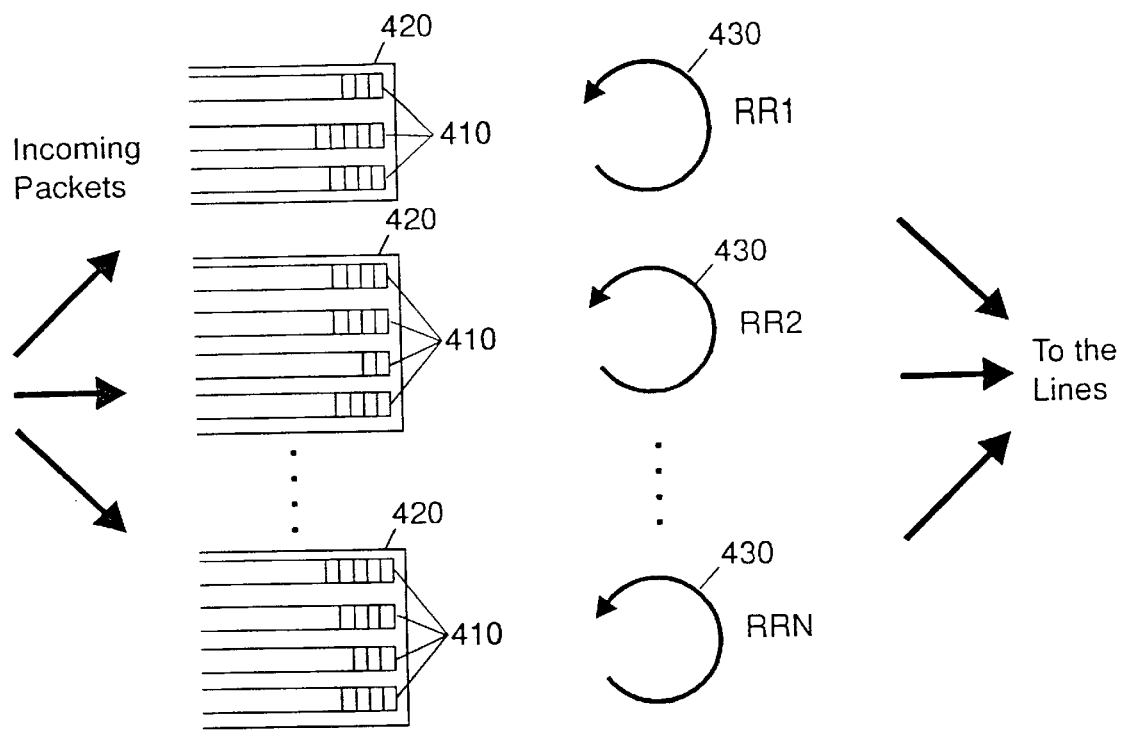
FIG. 4 is a simplified schematic illustrating one aspect of the queueing and transmission scheduling system according to the invention.

Referring to FIG. 4, there is shown a simplified schematic illustrating one aspect of the transmission scheduling system of the present invention. The system comprises as many queues 410 as connections established to the transmit part of the adapter. Then connections are grouped in function of their QOS characteristics i.e. their priority class, in priority groups 420. This grouping is actually achieved by queueing the connection identifiers from connections belonging to the same priority group, in a corresponding priority round-robin queue. Accordingly there are as many priority round-robin queues as there are priority groups. In FIG. 4, N priority groups are represented (where N is an integer) from 1 through N, with N corresponding to the highest priority. A round-robin (RR) scheduler (i.e. queue) 430 exists for each priority group for dequeueing packets from the connections queues belonging to a same priority class in a round-robin manner, assigning the same weight to each connection. Alternatively, a different weight could be assigned to connections of a same priority class, so as to implement a so-called weighted fair scheduling. Then, a higher level scheduler also called general scheduler (not represented) schedules the transmission of packets over the output lines, starting with the highest priority round-robin scheduler i.e. RR for priority N, and staying blocked on it as long as there are packets queued in the corresponding connections queues. When there is no more packets queued in the current RR connection queues, the general scheduler starts again with the next priority RR scheduler i.e. with the RR for priority (N-1) and carries on until the lowest priority RR connection queues have been dequeued i.e. RR for priority 1. In FIG. 4 only one aspect of a queueing and transmission system according to the invention has been illustrated. According to this aspect, the system of the invention relies on multiple criteria two of which being : firstly the fairness (round-robin scheduling) applied to connections within a same priority class (QOS), and secondly the connection QOS priority. As ex4 plained further, in conjunction with FIG. 5 and FIG. 6, the queueing and transmission scheduling system of the invention relies on a third criterion, which is the behaviour of the connection with respect to its traffic profile contracted at call setup.

In the network of the preferred embodiment of the invention, behaviour of the connection is already regulated by a policing function realized through a well-known congestion control leacky bucket (LB) mechanism implemented at the network nodes. The LB mechanism performs two actions: tagging and discarding. Tagging consists in marking packets as excess when they arrive above the committed burst rate. Packets marked excess are also called red packets, while non-excess packets are called green. Discarding consists in discarding packets that arrive at a rate larger than the committed rate plus the extra rate being allowed as excess. Tagging is performed at the network entrance. The system of the invention uses the preexisting leaky bucket classification of packets for classifying the connections to the transmit adapter part of the switching node into green or red connections, according to the process illustrated in FIG. 5 and described hereinafter.

Figure 5A:
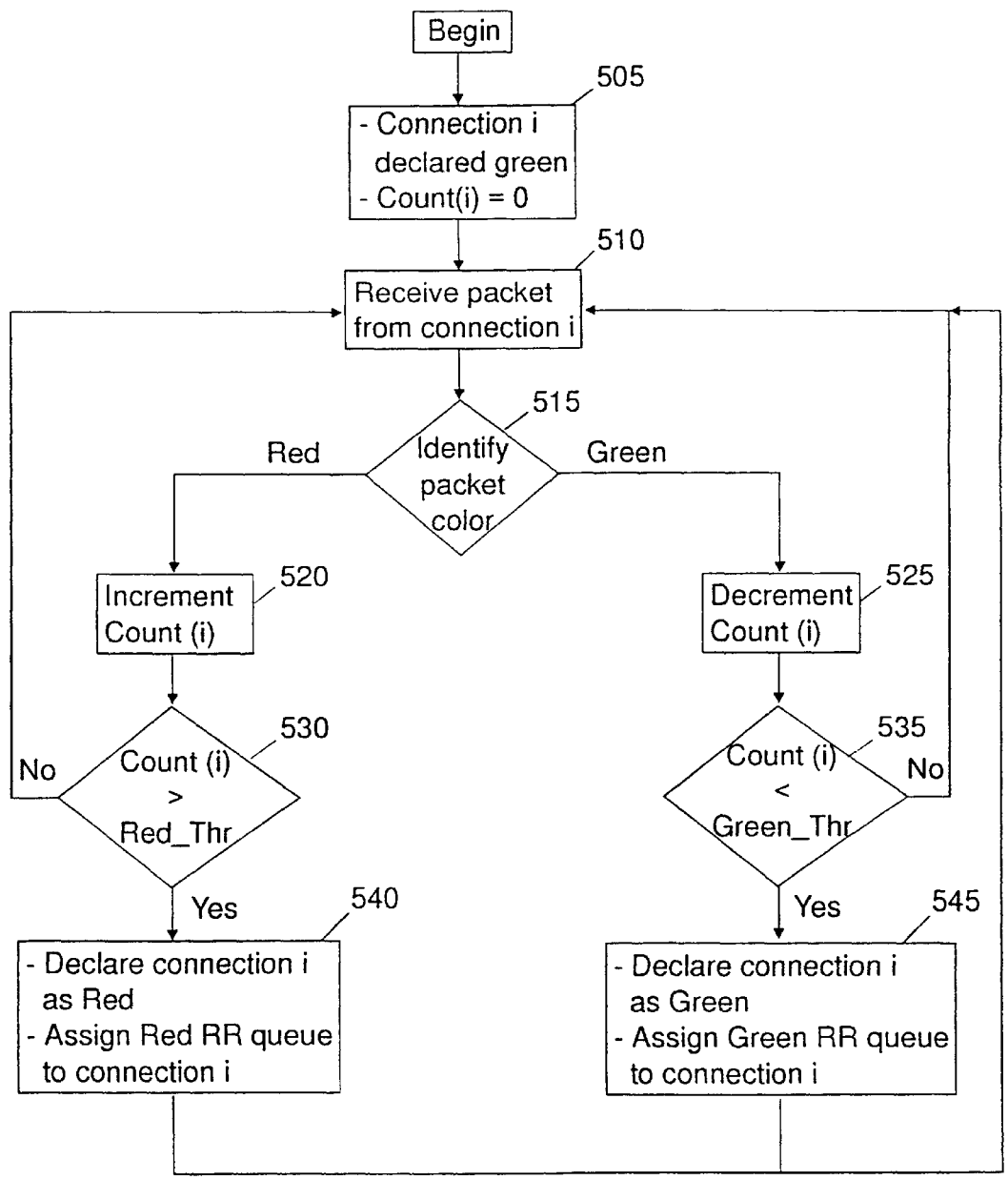
FIG. 5 which includes FIG. 5A
FIG. 5B is a flow chart illustrating the sequence of operations required for classifying connections according to their excess or non-excess traffic profile.
Figure 5B:
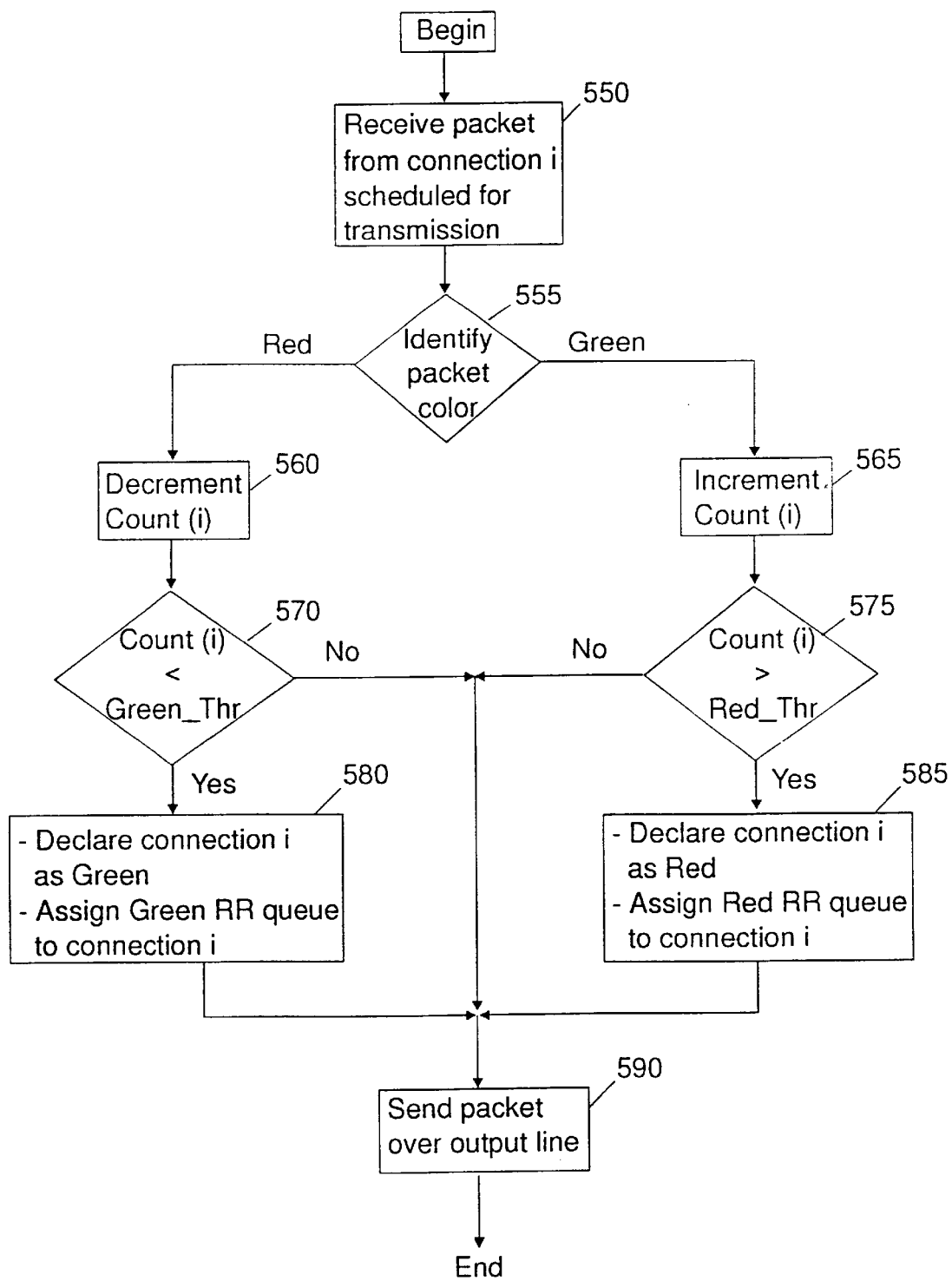

FIG. 5 is a flow chart illustrating the sequence of operations required for classifying connections according to their excess or non-excess traffic profile. FIG. 5 is divided into FIG. 5A and FIG. 5b. FIG. 5A depicts the process of operations for classifying (red/green) connections, while FIG. 5B depicts the process of operations for refreshing classification of connections performed according to FIG. 5A, before packets are transmitted over the output line.

Referring to FIG. 5A, in initialization box 505, current connection (i) is declared green and a counter COUNT(i) associated to current connection (i) is set to zero. In box 510, a packet from current connection (i) is received. Then in decision box 515, the color of the current packet is identified by testing a color identifier located in the packet header. If packet is red, box 520 is entered to increment counter COUNT(i). Then, in decision box 530, COUNT(i) is compared to a first predefined threshold value Red_Thr. If COUNT(i) is less than Red_Thr, no further action is made and box 510 is re-entered to restart the foregoing operations with the next packet received from current connection (i). Conversely, if COUNT(i) is greater than Red_Thr, box 540 is entered for declaring current connection (i) as red and assigning a correspondant red round-robin queue to current connection. Then box 510 is re-entered to restart the foregoing operations with the next packet received from the current connection. Back to decision box 515, if the color of the current packet is green, box 525 is entered to decrement COUNT(i). Then, in box 535, COUNT(i) is compared to a second predefined threshold number Green_Thr. In the preferred embodiment of the invention, first threshold Red_Thr is chosen as being superior or equal to second threshold Green_Thr. If COUNT(i) is not less than Green_Thr, no further action is made and box 510 is re-entered to restart the foregoing operations with the next packet received from current connection (i). Conversely, if COUNT(i) is less than Green_Thr, box 545 is entered for declaring current connection (i) as green and assigning a correspondant green round-robin queue to current connection. Then, box 510 is re-entered to restart the foregoing operations with the next packet received from current connection. In other words, for each QOS priority class, two round-robin queues are implemented, one called red-RR queue containing connection identifiers from connections declared red i.e. "misbehaving" connections, according to the process of FIG. 5A; the other queue, called green-RR queue, containing connection identifiers of connections declared green i.e. "wellbehaving" connections, according to the process of FIG. 5A.

Then, further, before each packet transmission scheduling over the output line (the packet has been previously dequeued from the associated connection queue), a process for refreshing the color of the connection to which the packet belongs is operated according to the flow chart represented in FIG. 5B. Referring to FIG. 5B, in box 550, a packet is received from a connection i. In decision box 555, the color of the packet is identified and a decision is made according to its color. In box 560, if packet's color is identified as red, connection-associated counter COUNT(i) is decremented as received packet is no longer enqueued in the connection queue, and box 570 is entered for comparing COUNT(i) to predefined threshold Green_Thr. Then, in box 580, connection (i) si declared green if COUNT(i) is less than Green_Thr, and finally in box 590, packet is transmitted over the output line. In the other hand, if COUNT(i) is not less than Green_Thr, box 590 is directly entered for transmitting packet over the output line and connection's color remains unchanged. Back to decision box 555, if the color of the packet is green, COUNT(i) is incremented in box 565 as one green packet has been dequeued from the connection queue. Then, in box 575 COUNT(i) is compared to Red_Thr; and, in box 585 connection (i) is declared red if COUNT(i) is greater than Red_Thr. Finally, in box 590, packet is transmitted over the output line. In the other hand, if COUNT(i) is not greater than Red_Thr, box 590 is directly entered for transmitting packet over the output line and the connection's color remains unchanged.

Figure 6:
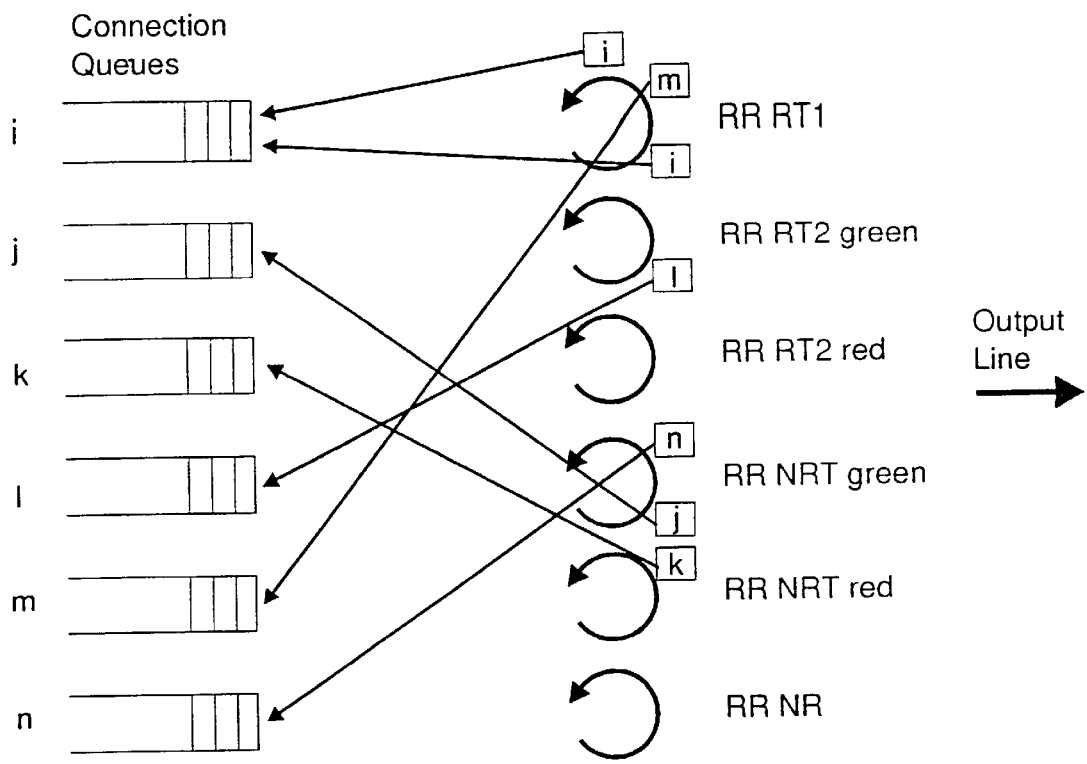
FIG. 6 is a simplified schematic illustrating the queueing and scheduling operations as function of priority and behaviour of connections.

FIG. 6 shows a simplified schematic illustrating the queueing and scheduling operations as function of priority and behaviour of connections. Incoming packets from connections i-to-n are enqueued into queues i-to-n. Then connections are classified red or green according to the process described hereinabove in connection with FIG. 5, and are associated to a predefined round-robin (RR) queue given their "color" (i.e. behaviour) and their priority class (i.e. QOS characteristics). In the preferred embodiment of the invention, there are four types of priority queues:

Real-time-1 (RT1) queue, for real-time applications requiring very low delay and very low jitter, such as some constant bit rate data and voice; it provides lowest delay and jitter.

Real-time-2 (RT2) queue, for real-time applications that can support slightly more delay and jitter, such as some constant bit rate data or voice.

Non-real-time (NRT) queue, for applications requiring guaranteed bandwidth but not sensitive to delay or jitter, such as frame relay or HDLC.

Non-reserved (NR) queue, for applications that do not need delay and bandwidth (QOS) guarantees (only best-effort delivery).

The first three queues are called reserved bandwidth queues, since network bandwidth is reserved at every link along the path. The fourth queue is, as the name says, non-reserved, meaning no bandwidth is reserved for data in this queue. The RT1 and RT2 queues have the highest transmission priority, the NRT queue is next in priority, and the NR queue has the lowest priority. The RT2 and NRT queues recognize two discard priorities in arriving packets: excess and non-excess. Packets marked excess are accepted only if the queue occupancy is below a certain threshold. Non-excess packets are always accepted, as long as the queue is not full. The RT1 and NR queues do not have these discard priorities. RT1 packets always enter the network as non-excess, and bandwidth reservation ensures that there is always room for them in the RT1 queue. NR packets always enter the network without any QOS guarantees, and they are accepted as long as the NR queue is not too loaded. As previously said, the discard priority of a packet is set as it enters the network. This is performed by the access agent when determining that a given user is not conforming to his agreed-to network usage (e.g. a frame relay user transmitting above his Committed Information Rate). These non-conforming excess packets are allowed into the network, but are not given QOS (packet loss ratio) guarantees. Consequently, according to the preferred embodiment of the invention, the connection marking as explained above in connection with FIG. 5, is applied only to connections having priorities RT2 or NRT, and only these connections are associated to a corresponding red or green RT2/NRT round-robin (RR) queue in accordance with their behaviour (red or green).

Then, still referring to FIG. 6, there is shown only one RR queue for each of the priority classes RT1 and NR, but there are two RR queues for each of the priority classes RT2 and NRT, these are RR RT2/NRT green and RR RT2/NRT red. As shown in FIG. 6, each of the RR queues contain identifiers from connections of corresponding priority and behaviour (for RT2 and NRT RR queues) that have packets to transmit, i.e. enqueued in their respective connection queue. Connection identifiers (CIs) are enqueued in the RR queues in accordance with the order of arrival of packets belonging respectively to these connections, ensuring fairness. In the RR queues, if a simple fair queueing is implemented, there is only one instance of a same CI in the RR queues. If a weighted fair queueing is implemented as it is in the case of the preferred embodiment of the invention, an additional parameter representing the "connection weight parameter" (WP) is associated with each connection; this parameter indicates the maximum number of simultaneous occurrences of a connection identifier (CI) in the RR queues.

In FIG. 6, as represented in RT1 RR queue, connections i and m are of RT1 priority (highest priority) with connection i having a WP of 2, while WP for connection m is 1. Round-robin queue for RT2 green connections (RR RT2 green) contains only one connection identifier (CI) for connection 1. Further in FIG. 6, there is no connection identifier in round-robin RT2 red, that is, no connection of priority RT2 has been declared red; while there are two NRT connections declared green (n, j) as shown in RR NRT green, and one NRT red connection (k) as shown in RR NRT red. Finally, there is no connection of NR priority as shown with NR round-robin (RR NR).

In operation, transmission scheduling of packets over output line is accomplished prioritizing firstly high priority connections versus lower priority connections and secondly green connections versus red connections. In FIG. 6 the transmission of packets is accomplished in the following order: first, connection queues the identifiers of which are enqueued in RR RT1 are dequeued (here: i, m); then, when RT1 connections queues are empty, RT2 green connection queues the identifiers of which are enqueued in round-robin RT2 green are dequeued (here: I), and so forth for RT2 red connections (RR RT2 red), followed by NRT green connections (RR NRT green) and then by NRT red connections (RR NRT red). Finally, NR connections (RR NR) are dequeued. It must be understood that, if a higher priority round-robin receives connection identifiers (CIs) from corresponding higher priority connections while a lower priority round robin was in operation i.e. transmitting packets from connections the CIs of which are queued in said lower priority round-robin, transmission of packets from these latter (lower priority) connections is interrupted to let the higher priority round-robin schedule the transmission of packets from the higher priority connections. In other words, a higher priority round-robin always preempts a lower priority round-robin for scheduling transmission of packets.

Figure 7:
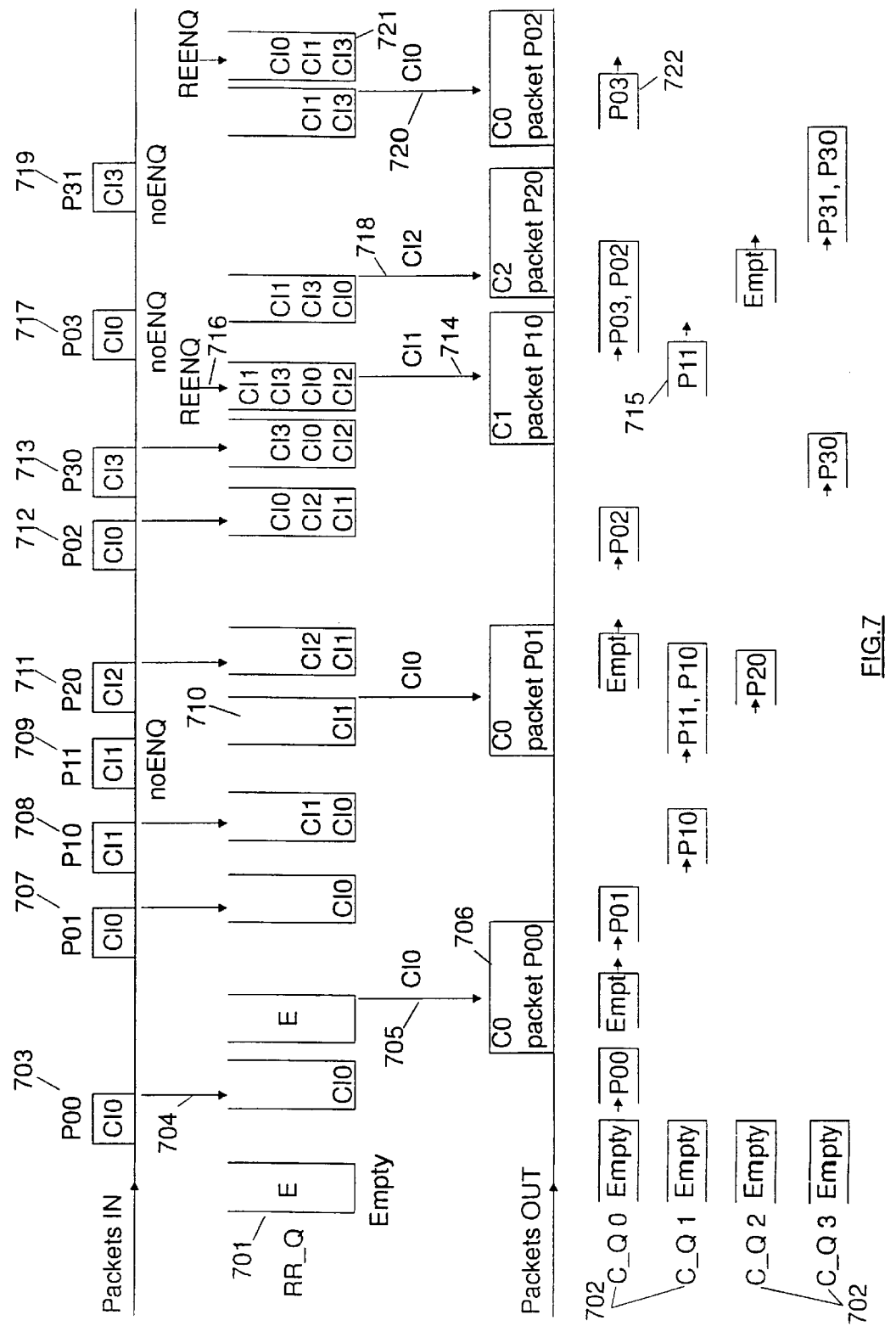
FIG. 7 is an illustration of a packet transmission scheduling using one priority round-robin achieving fairness between connections of the same class of service and behaviour, in accordance with the present invention.

FIG. 7 is an illustration of a packet transmission scheduling using one priority round5 robin achieving fairness between connections of the same class of service (priority) and behaviour, in accordance with the present invention. Referring to FIG. 7, there is shown one priority round-robin queue RR_Q (701) that schedules transmission of packets from four connections C0, C1, C2 and C3 which are enqueued respectively in connection queues C_Q0, C_Q1, C_Q2, C_Q3 (702). In the lower part of the drawing the evolution over time of the connections queues 702 is shown, while in the upper part of the drawing there is shown the evolution over time of the round-robin queue (701) containing the connection identifiers (CIs). At initialisation connections queues 702 are empty. Then, in 703, a first packet P00 is enqueued in connection queue C_Q0; as round-robin queue RR_Q is empty, connection identifier of C0 (CI0) is enqueued in RR_Q (704) and immediately dequeued (705) from RR_Q to schedule transmission of C0 packet P00 (706) over output line. In 707, a new packet P01 in enqueued is connection queue C_Q0 and again connection identifier of C0 (CI0) is enqueued in RR_Q. In 708, a first packet P10 from connection CI is enqueued in queue C_Q1 and connection identifier of CI (CI1) is immediately enqueued in RR_Q. In 709, another packet P11 from connection CI is enqueued in C_Q1; as CI identifier is already in RR_Q, there no change in RR_Q. In 710, identifier for connection C0(CI0 ) is dequeued from RR_Q for scheduling transmission of packet P01. In 711, a first packet P20 from connection C2 is enqueued in C_Q2 and consequently connection identifier of C2 (CI2) is enqueued in RR_Q. In 712, a third packet P02 from connection C0 is enqueued in C_Q0 and, as there was no more connection identifier of C0 (CI0) in RR_Q, CI0 is enqueued in RR_Q. In 713, a first packet P30 from connection C3 is enqueued in C_Q3 and connection identifier of C3 (CI3) is enqueued in RR_Q. Simultaneously, connection CI is scheduled for transmission as shown with dequeueing of CI1(714) and packet P10 is transmitted. As there is still a packet P11 queued in C_Q1 (715), connection identifier of C1 (CI1) is re-enqueued in RR_Q (716). In 717, a fourth packet P03 is enqueued in connection C0 queue C_Q0, but as connection identifier of C0(CI0) is still queued in RR_Q, there is no change in RR_Q. In 718, connection identifier of C2(CI2) is dequeued from RR_Q for scheduling transmission of packet P20. In 719, a second packet from connection C3 is enqueued in C_Q3; as connection identifier of C3(CI3) is already in RR_Q, there no change in RR_Q. In 720, connection identifier of C0(CI0) is dequeued from RR_Q for scheduling transmission of packet P02. In 721, as there is still a packet P03 queued in C_Q0(722), connection identifier of C0 (CI0) is re-enqueued in RR_Q.

It should be noted that, in the example of FIG. 7, there is only one identifier at a time for a given connection queued in the round-robin queue, but a weighted fair queueing could also be implemented whereby a given connection may have several instances of its connection identifier queued at the same time in the round-robin queue in accordance with a predetermined weight number associated with this connection.

As explained hereinabove, each priority class is associated with a certain number of connection queues of that priority, by means of a round-robin queue containing connection identifiers (see FIG. 6). For purposes of simplification, the term "priority queue" is intended hereinafter to designate a group of connection queues of the same priority.

The present invention also provides a mechanism of dynamic coupling of priority classes, which is intended to prevent red higher priority traffic from blocking green lower priority traffic. This process is preferably implemented at the entrance of the transmit adapter (see FIG. 9, 910) where packets are received from the switch. In the preferred embodiment of the invention this "coupling" of priority classes is implemented between real-time-2 (RT2) priority and non-real-time (NRT) priority. As red RT2 packets have priority over green NRT packets, this scheme is intended for preventing incoming red RT2 packets from blocking transmission of green NRT packets and thus penalizing well-behaved NRT users. The principle of the RT2/NRT dynamic coupling mechanism is as follows. Each one of the NRT and RT2 priorities is associated with a threshold indicative of an amount of red packets above which respective red packets are discarded. These thresholds are referred to as RT2_THR and NRT_THR and are greater than zero. A third threshold RT2_THRC, referred to as "coupling threshold", is set to one of two predetermined values referred to as V1 and V2, with V2 being greater than V1. in the preferred embodiment V1 is set to zero and V2 is set to RT2_THR. Coupling threshold RT2_THRC is set to V1 (zero) when incoming packets are of red RT2 type while NRT queue still contains green packets, so as to discard incoming red RT2 packets (if their number goes above V1) and let NRT green packets be transmitted. In the other hand, RT2_THRC is set to V2 (RT2_THR) when incoming packets are of red RT2 type while NRT queue does not contain any more green packets, so as to accept incoming RT2 red packets at the condition that the total amount of red packets in the RT2 queue is less than V2. In other words, incoming red RT2 packets are accepted if the total number of RT2 red packets already queued in RT2 queue is less than coupling threshold RT2_THRC, with RT2_THRC taking one of two distinct values (V1, V2) upon predetermined conditions on NRT queue. This coupling mechanism will be better understood through the following description in connection with FIG. 8.

Figure 8:
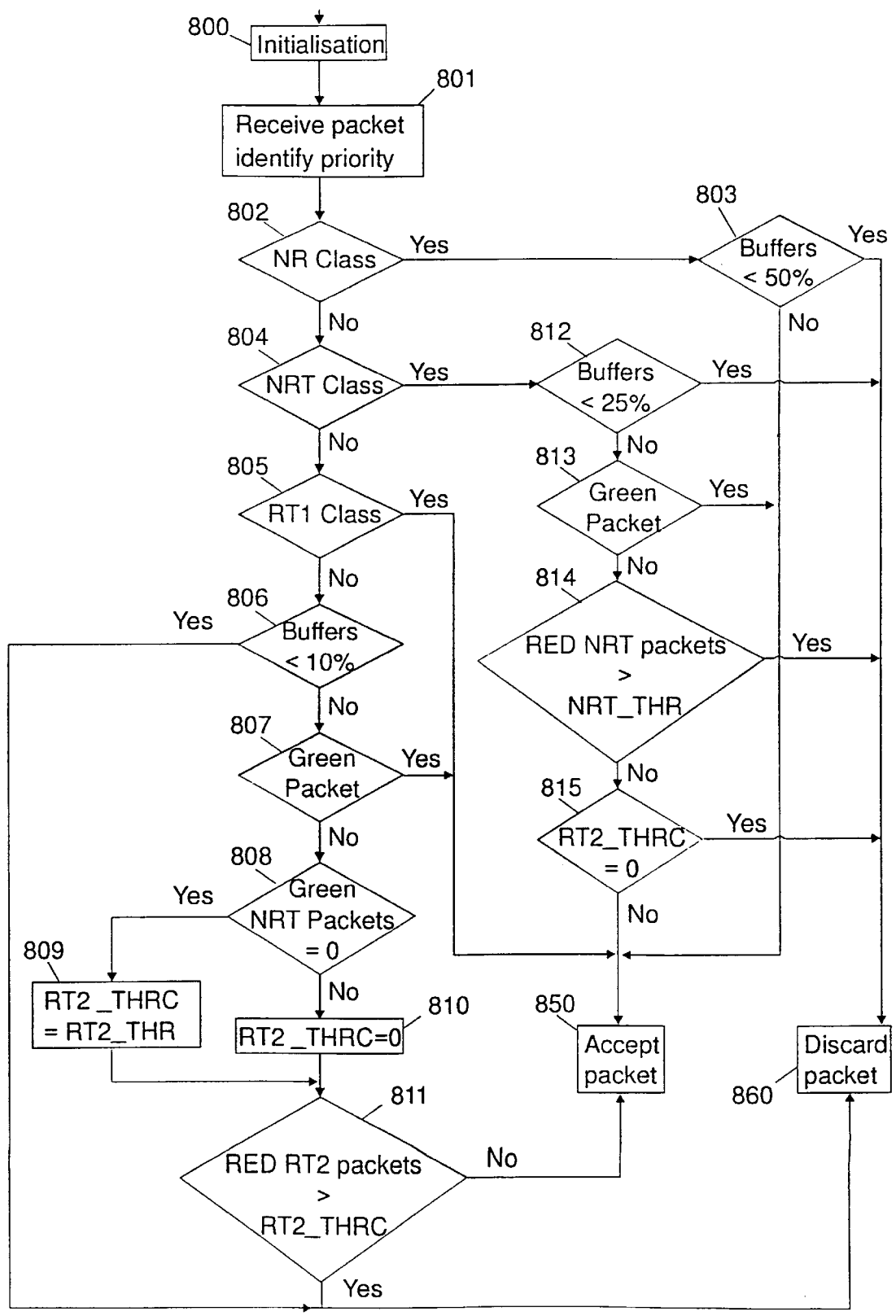
FIG. 8 is a flow chart of a dynamic coupling of priority queues scheme according to the present invention for preventing that red higher priority traffic from blocking green lower priority traffic.

FIG. 8 shows a flow chart of the dynamic coupling of priority queues scheme which is implemented within the present invention in order to prevent, as said above, that red higher priority traffic blocks green lower priority traffic. Referring to FIG. 8, in box 800, parameters such as thresholds RT2_THR, RT2_THRC, NRT_THR are initialized to predetermined values. Then, as represented in box 801, each time a packet is received from the switch, its class of service i.e. priority (NR, NRT, RT1, RT2) is identified; and decisions are further taken according to the priority identified, as follows. In decision box 802, if packet priority is non-reserved (NR) then in box 803, the occupancy of the adapters queueing buffers is checked. If buffer capacity (i.e. free buffers) is greater then 50 percent of the total buffering capacity, the packet is accepted (850), else it is discarded (860). If packet priority is not NR, box 804 is entered for testing if packet priority is non-real-time (NRT). If packet is not NRT then box 805 is entered to determine if packet is of real-time-1 (RT1) class, RT1 being the highest priority class. If so, packet is accepted (850); if not, packet is necessarily of real-time-2 class (RT2) and box 806 is entered for comparing the present buffer capacity to 10 percent of the total buffer capacity. If buffer capacity is less than 10 percent, incoming packet is discarded (860). At the contrary, if buffer capacity is greater then 10 percent, box 807 is entered for testing the color of the packet. If packets color is green, that is, packet is RT2 non-excess, packet is accepted (850). If not, packet is RT2 excess (red) and box 808 is entered to test the number of green packets in the nonreal-time (NRT) queue. If this number is not equal to zero i.e. greater than zero, box 809 is entered to set coupling threshold RT2_THRC to RT2_THR (RT2_THR is indicative of a predetermined acceptable amount of red packets in RT2 queue). As said above, threshold NRT_THR is initialized to a predetermined value at initialization step in box 800. Conversely, if the number of green packets in NRT queue is zero, coupling threshold RT2_THRC is set to zero in box 810. Finally, in box 811, the number of red RT2 packets in RT2 queue is compared to coupling threshold RT2_THRC. If this number is greater than RT2_THRC incoming packet is discarded (860). If not, it is accepted (850). As RT2_THRC can take two values: zero or RT2_THR, it results that if RT2_THRC equals zero (0) meaning that there are still green packets in NRT queue, red RT2 packets are not accepted at all. Back to decision box 804, if packet is of NRT class, decision box 812 is entered and present buffer capacity is compared to 25 percent of the total buffering capacity. If the present buffering capacity is less than 25 percent of the total capacity, packet is discarded (860), else box 813 is entered for testing packet's color. If packet's color is green, that is, packet is NRT non-excess, packet is accepted (850). Else, if packet is red, i.e. excess, box 814 is entered for computing the total number of red NRT packets which are queued in NRT queue, and comparing this number to threshold NRT_THR. If the number of red NRT packets is greater than NRT_THR, then present received packet is discarded (860). Conversely, if number of NRT red packets is less than NRT_THR, decision box 815 is entered for comparing threshold RT2_THRC to zero. If RT2_THRC is equal to zero then incoming NRT green packet is discarded. As already said, RT2_THRC is a dynamic coupling threshold associated with Real-Time-2 (RT2) queue; it is "dynamic" because it can take two values: zero and RT2_THR (i.e. V1 and V2), RT2_THR being a threshold indicative of a predetermined number of red packets in the RT2 queue. RT2_THRC ensures a "coupling" between RT2 and NRT queues in such a way that when NRT queue still contains green packets, next incoming red RT2 packets are discarded, thereby ensuring that "well-behaving"NRT users should not be penalized by "misbehaving" RT2 users.

Figure 9:
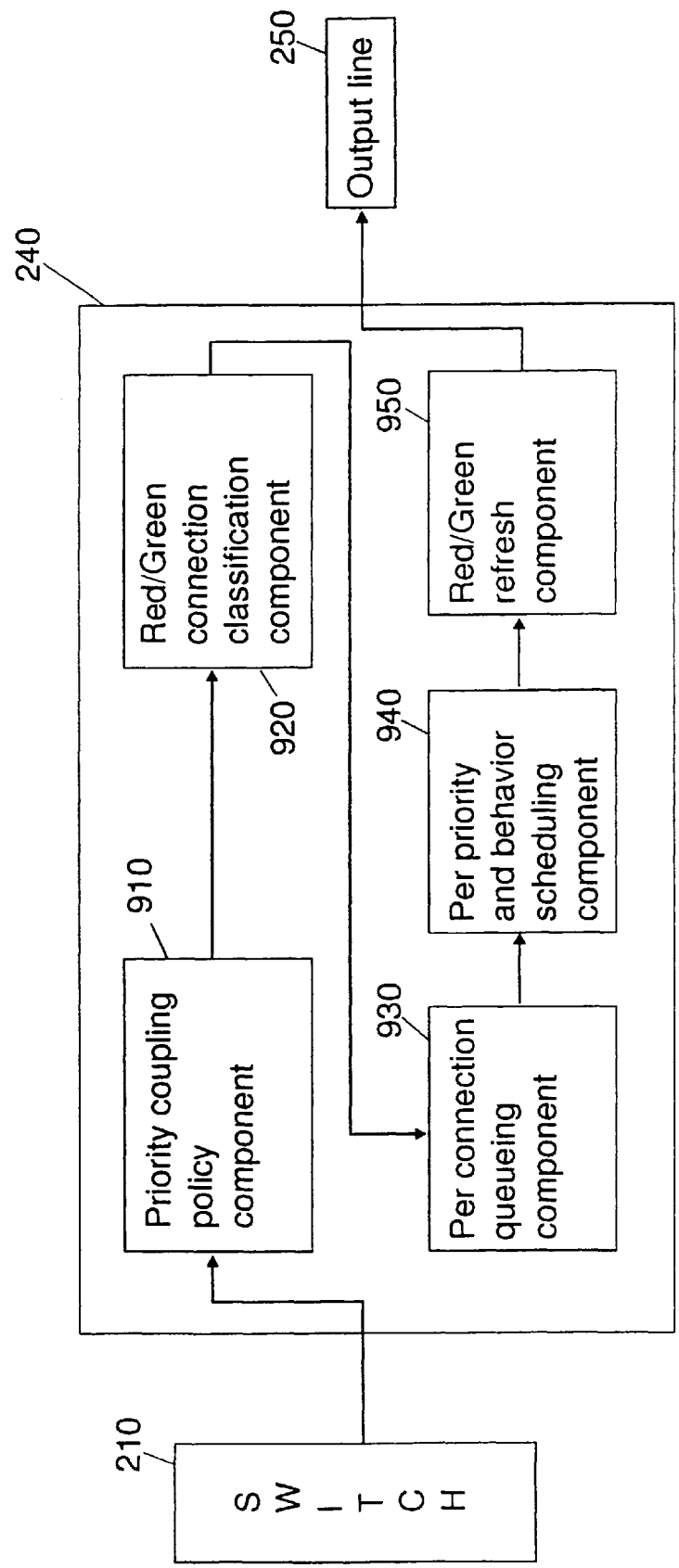
FIG. 9 is a block diagram showing the logical implementation of the major components of the queueing and scheduling system of the present invention.

FIG. 9 is a block diagram showing the logical implementation of the major components of the queueing and scheduling system of the present invention. Adapter transmit part 240 connects switch 210 to output line 250. Incoming packets from switch 210 enter adapter transmit part at block 910 which represents the priority coupling policy component described above in connection with FIG. 8. Packets that have not been discarded in policy component 910, enter red/green connection classification component 920 wherein corresponding connections are classified as excess (red) or non-excess (green) according to the process described above in connection with FIG. 5A. After connections have been classified, block 930 is entered for queueing packets in as many queues as there are connections established, according to their origin connection as described above in connection with FIG. 4. Then, block 940 is entered for scheduling transmission of packets according to the priority and behaviour of connections, as described above in connection with FIG. 6 and FIG. 7. Then, red/green refresh component 950 is entered for refreshing the classification of connections that were performed in block 920, according to the process described above in connection with FIG. 5B. Finally, packets are transmitted over output line 250.

In brief, as described above, the present invention provides a system of packet queueing and transmission scheduling for use in a switching node of a high speed packet switching network. Incoming packets from connections established through the switching node are enqueued in corresponding connection queues. The connections are classified into excess or non-excess, achieving a behaviour classification of connections. QOS priority is also identified for each connection. Then, dequeueing of packets for transmission from connection queues is scheduled given the priority class and the behaviour classification of the connections. Prioritization for dequeuing connection queues is implemented as follows. Higher priority connections have priority over lower priority connections. Furthermore, within a given priority group of connections, non-excess connections have priority over excess connections. Finally, fairness is achieved when scheduling transmission of packets from connections having identical priority and behaviour. In addition, a dynamic priority coupling mechanism is provided to prevent excess higher priority traffic from blocking non-excess lower priority traffic.

While the invention has been described in terms of preferred embodiments, those skilled in the art will recognize that the invention can be practiced with variations and modifications. Therefore, it is intended that the appended claims shall be construed to include both preferred embodiments and all variations and modifications thereof that fall within the true spirit and scope of the invention.

Having thus described our invention, what we claim as new and desire to secure by Letters Patent is as follows:

1. A packet scheduling system for use in a switching node of a high speed packet switching network, the switching node having a plurality of input and output links for receiving and transmitting packets received on a plurality of connections from a wide range of applications, said packet scheduling system comprising:

connection classification logic for assigning each of the plurality of connections either to a first class of connections carrying excess traffic or to a second class of connections not carrying excess traffic, said connection classification logic marking, as green, each originating connection which does not carry excess traffic and, as red, each originating connection which does carry excess traffic and wherein each packet includes an identifier indicative of the priority class of its originating connection;

a set of connection queues for temporarily storing packets received from the plurality of connections into a plurality of queues, each said queue being assigned to only one connection;

priority classification logic for assigning each of the plurality of connections to a priority class as a function of the quality of service requested by each connection;

packet scheduling logic for scheduling the transmission of the packets over at least one output link, said packet scheduling logic dequeueing packets from said plurality of connection as a function of the priority class and connection class of each of the connections, said packet scheduling logic assigning a higher transmission priority to packets from a higher priority class than to packets from a lower priority class, assigning priority to packets received on packets received on connections belong to the first class of connections if contending packets are from connections falling within the same priority class but different connection classes, and assigning priority using round-robin scheduling if contending packets are from connections falling within the same priority class and the same connection class; and additional logic for assigning transmission preference to packets from a given lower priority class having a green connection classification relative to contending packets from a given higher priority class having a red connection classification, said additional logic comprising a first counter for computing the total number of red packets already queued in the connection queues associated with said given first and second priority classes;

a second counter for computing the total number of green packets already queued in the connection queue associated with said second priority class; and a comparator for comparing the total number of red packets of said first priority class to a dynamic threshold and discarding any incoming red, first priority packets if said total amount of red first priority packets is greater than said dynamic threshold; said dynamic threshold being set to a first predefined value when the total number of queued green packets of said second priority class is greater than zero, or to a second predefined value otherwise, said second predefined value being greater than said first predefined value.

2. The system as set forth in claim 1 wherein said connection classification logic further comprises:

a counter which is incremented for each new incoming red packet and decremented for each new incoming green packet; and a comparator for comparing the contents of said counter to a first threshold and to a second threshold with said first threshold being greater than or equal to said second threshold, said connection classification logic identifying a classification as red when said counter contents are greater than said first threshold and as green when said counter contents are less than said first threshold.

3. For use in a switching node of a high speed packet switching network, the switching node having a plurality of input and output links for receiving and transmitting packets received on a plurality of connections from a wide range of applications, a method of scheduling packets for transmission on said output links, said method comprising the steps of:

classifying each connection carrying excess traffic as belonging to a red connection class and each connection not carrying excess traffic as belonging to a green connection class;

temporarily storing packets received from the plurality of connections into a plurality of queues, each said queue being assigned to only one connection;

assigning a priority class to each of the plurality of connections, said priority class being a function of the quality of service requested by the respective connection;

scheduling contending packets for transmission as a function of said priority class and said connection class of the connections carrying the packets;

transmitting contending packets from a higher priority class connection before packets from a lower priority class connection such that where the connections over which contending packets are received are in the same priority class, transmitting packets received on green connections before transmitting packets received on red connections, and where the connections over which contending packets are received are in the same priority class and in the same connection class scheduling packets using a round-robin service discipline; and transmitting a packet received over a green connection having a given lower priority class in preference to a contending packet received over a red connection having a given higher priority class.

4. The method as set forth in claim 3 wherein said step of transmitting a packet further comprises the steps of:

maintaining a count of the total number of temporarily stored packets received over red connections in either the given lower priority class or the given higher priority class;

maintaining a count of the total number of temporarily stored packets received on green connections; and comparing the total count of red packets of said higher priority class to a dynamic coupling threshold and discarding any incoming red packet in said higher priority class if said total amount of red first priority packets is greater than said dynamic coupling threshold, said dynamic threshold being a function of the total number of green packets in said lower priority class.

5. A packet scheduling system suitable for use in a switching node in a packet switching network for scheduling the transmission of switched packets onto a plurality of connections, each connection having a pre-determined quality of service (QoS) requirement, the switching node having a plurality of connection queues for receiving the switched packets from a switching fabric, each switched packet marked as a non-excess packet when within the reserved bandwidth of the respective connection or marked as an excess packet when over the reserved bandwidth of the respective connection, each connection queue being assigned to a corresponding connection, said packet transmission scheduling system comprising:

transmission priority classification logic for assigning a transmission priority to each connection, said transmission priority being a function of the QoS requirement for the corresponding connection, such that a connection having a reserved bandwidth is assigned a higher said transmission priority than a said transmission priority assigned to a connection having no reserved bandwidth, and such that a connection having higher sensitivity to delay and jitter is assigned a higher said transmission priority than a said transmission priority assigned to a connection having lower sensitivity to delay and jitter;

transmission priority grouping logic for placing those connections assigned a particular said transmission priority into a group, the priority of said group being a function of said particular transmission priority such that a higher-priority group includes connections of a higher said transmission priority than said transmission priority of connections placed into a lower-priority group;

packet transmission scheduling logic for scheduling the transmission of packets over respective connections as a function of said group priorities such that packets queued on connections in said higher-priority group are dequeued before packets queued on connections in said lower-priority group;

connection group dequeueing logic for dequeueing packets queued within a particular said group using round-robin scheduling;

connection classification logic for classifying connection queues as a function of switched traffic behavior, such that a particular connection queue is classified as well-behaving if the number of queued non-excess switched packets in said particular connection queue is less than a first predetermined threshold value, or is classified as misbehaving if the number of queued excess switched packets in said particular connection queue is greater than a second predetermined threshold value; and connection classification grouping logic for placing connections of a selected said group into connection subgroups as a function of connection classification, such that a well-behaving connection queue is placed into a well-behaving connection subgroup and a misbehaving connection queue is placed into a misbehaving connection subgroup.

6. The packet scheduling system as set forth in claim 5 comprising connection subgroup prioritizing logic for scheduling the transmission of packets within a said group as a function of subgroup classification, such that packets queued on connections in said well-behaving connection subgroup are dequeued before packets queued on connections in said misbehaving connection subgroup.

7. The packet scheduling system as set forth in claim 6, further comprising priority coupling logic for assigning relative transmission priorities between said well-behaving connection subgroup in said lower-priority group and said misbehaving connection subgroup in said higher-priority group.

8. The packet scheduling system as set forth in claim 7 wherein said priority coupling logic comprises:

a first counter for determining the number of non-excess switched packets queued in the connection queue associated with said well-behaving connection subgroup in said lower-priority group, to give a non-excess packet count;

coupling threshold logic for setting a coupling threshold parameter to either a first threshold value when said non-excess packet count is equal to zero, or to a second threshold value when said non-excess packet count is not equal to zero;

a second counter for determining the number of excess switched packets queued in the connection queue associated with said misbehaving connection subgroup in said higher priority group, to give an excess packet count; and a coupling comparator for comparing said excess packet count to said coupling threshold parameter such that said excess switched packets are dequeued if said coupling threshold parameter is set to said first threshold value, and said excess switched packets are not dequeued if said coupling threshold parameter is set to said second threshold value.

9. The packet scheduling system as set forth in claim 5 herein said connection classification logic further comprises:

a packet counter which is incremented for each excess switched packet incoming on a selected connection, and decremented for each non-excess switched packet incoming on said selected connection; and a classification comparator for comparing the counter reading to an excess threshold value and to a non-excess threshold value with said excess threshold value being greater than or equal to said non-excess threshold value, such that said connection classification logic classifies said selected connection as misbehaving when said counter reading is greater than said excess threshold value and classifies said selected connection as well-behaving when said counter reading is smaller than said non-excess threshold value.

10. The packet scheduling system as set forth in claim 6 further comprising:

an excess packet counter for determining the number of said excess switched packets queued in the connection queue associated with said misbehaving connection subgroup, to give an excessive value; and an excess packet comparator for comparing said excessive value to an excessive threshold value, such that said excess switched packets are dequeued if said excessive value is less than said excessive threshold value, and such that said excess switched packets are discarded if said excessive value is greater than or equal to said excessive threshold value.

11. A packet queueing and transmission scheduling method suitable for use in scheduling the transmission of switched packets onto a plurality of connections from a switching node in a packet switching network, each connection having a pre-determined quality of service (QoS) requirement, the switching node having a plurality of connection queues for receiving the switched packets from a switching fabric, each switched packet marked as a non-excess packet when within the reserved bandwidth of the respective connection or marked as an excess packet when over the reserved bandwidth of the respective connection, each connection queue being assigned to a corresponding connection, said method comprising the steps of:

assigning a transmission priority to each connection, said transmission priority being a function of the QoS requirement for the corresponding connection, such that a connection having a reserved bandwidth is assigned a higher said transmission priority than a said transmission priority assigned to a connection having no reserved bandwidth, and such that a connection having higher sensitivity to delay and jitter is assigned a higher said transmission priority than a said transmission priority assigned to a connection having lower sensitivity to delay and jitter;

placing those connections assigned a particular said transmission priority into a group, the priority of said group being a function of said particular transmission priority such that a higher-priority group includes connections of a higher said transmission priority than said transmission priority of connections placed into a lower-priority group;

scheduling the transmission of packets over respective connections as a function of said group priorities such that packets queued on connections in said higher-priority group are dequeued before packets queued on connections in said lower-priority group;

dequeueing packets queued within a particular said group using round-robin scheduling;

classifying connection queues as a function of switched traffic behavior, such that a particular connection queue is classified as well-behaving if the number of queued non-excess switched packets in said particular connection queue is less than a first predetermined threshold value, or is classified as misbehaving if the number of queued excess switched packets in said particular connection queue is greater than a second predetermined threshold value; and placing connections of a selected said group into connection subgroups as a function of connection classification, such that a well-behaving connection queue is placed into a well-behaving connection subgroup and a misbehaving connection queue is placed into a misbehaving connection subgroup.

12. The method as set forth in claim 11 further comprising the step of:

scheduling the transmission of packets within a said connection group as a function of subgroup classification, such that packets queued on connections in said well-behaving connection subgroup are dequeued before packets queued on connections in said misbehaving connection subgroup.

13. The method as set forth in claim 12 further comprising the steps of:

determining the number of non-excess switched packets queued in the connection queue associated with said well-behaving connection subgroup in said lower-priority group, to give a non-excess packet count;

setting a coupling threshold parameter to either a first threshold value when said non-excess packet count is equal to zero, or to a second threshold value when said non-excess packet count is not equal to zero;

determining the number of excess switched packets queued in the connection queue associated with said misbehaving connection subgroup in said higher priority group, to give an excess packet count; and comparing said excess packet count to said coupling threshold parameter such that said excess switched packets are dequeued if said coupling threshold parameter is set to said first threshold value, and said excess switched packets are not dequeued if said coupling threshold parameter is set to said second threshold value.

14. The method as set forth in claim 13 further comprising the steps of:

incrementing a packet counter for each excess switched packet incoming on a selected connection, and decrementing said packet counter for each non-excess switched packet incoming on said selected connection; and comparing the counter reading to an excess threshold value and to a non-excess threshold value, with said excess threshold value being greater than or equal to said non-excess threshold value, such that said selected connection is classified as misbehaving when said counter reading is greater than said excess threshold value and such that said selected connection is classified as well-behaving when said counter reading is smaller than said non-excess threshold value.

15. The method as set forth in claim 12 further comprising the steps of:

determining the number of said excess switched packets queued in the connection queue associated with said misbehaving connection subgroup, to give an excess value; and comparing said excessive value to an excessive threshold value, such that said excess switched packets are dequeued if said excessive value is less than said excessive threshold value, and such that said excess switched packets are discarded if said excessive value is greater than or equal to said excessive threshold value.

\* \* \* \* \*